UNITED STATES PATENT OFFICE.

PAUL JULIUS AND EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

GREEN-BLUE SULFUR DYE AND PROCESS OF MAKING SAME.

No. 820,501. Specification of Letters Patent. Patented May 15, 1906.

Application filed December 4, 1905. Serial No. 290,204.

*To all whom it may concern:*

Be it known that we, PAUL JULIUS, doctor of philosophy and chemist, a subject of the Emperor of Austria-Hungary, and EDUARD MÜNCH, doctor of philosophy and chemist, a subject of the Grand Duke of Baden, residing at Ludwigshafen-on-the-Rhine, in the Kingdom of Bavaria, German Empire, have invented new and useful Improvements in Green-Blue Sulfur Coloring-Matters and Process of Making the Same, of which the following is a specification.

Our invention relates to the manufacture of green-blue sulfur coloring-matters.

We have discovered that by allowing chloranil and unsymmetrical dialkyl-para-phenylene-diamin-thiosulfonic acid and a sulfurizing agent to act upon one another we can obtain green-blue coloring-matters which are very valuable, being extremely fast against the action of chlorin and light. Under the term "dialkyl-para-phenylene-diamin-thiosulfonic acid" we include both the dimethyl and the diethyl derivatives, and instead of these compounds their chemical equivalents—namely, their corresponding mercaptans or the disulfids—may be employed. The coloring-matters so obtained dye unmordanted cotton from an alkaline sulfid bath green-blue shades, which are very fast against the action of washing, light, chlorin, and boiling with acids. When dry, they consist of violet-black powders which are slightly soluble in hot water, yielding blue solutions, and are easily soluble in concentrated sulfuric acid, yielding bluish-green solutions. In hot sodium-sulfid solution they are easily soluble with a yellowish-brown color. They are insoluble in glacial acetic acid, in alcohol, and in acetone. They are very slightly soluble in anilin, yielding green solutions, and in phenol, yielding greenish-blue solutions. Moreover, they contain no copper, as do many of the green-blue sulfur coloring-matters hitherto described.

The following example will serve to further illustrate the nature of our invention and the method of carrying it into practical effect; but our invention is not confined to this example. The parts are by weight. Suspend seventy-five (75) parts of chloranil in five hundred (500) parts of water, add a solution of three hundred (300) parts of crystallized sodium sulfid in six hundred (600) parts of water, and when solution has taken place add a solution of seventy-five (75) parts of unsymmetrical dimethyl-para-phenylene-diamin-thiosulfonic acid in five hundred (500) parts of water and eighteen (18) parts of calcined soda, then add forty-five (45) parts of sulfur, and heat while stirring for about five (5) hours at a temperature of from sixty-five (65) to seventy-five (75) degrees centigrade. Filter off the coloring-matter, which is almost completely precipitated, and wash with a dilute solution of common salt.

Now what we claim is—

1. The process for the production of green-blue coloring-matters containing sulfur by allowing chloranil and unsymmetrical dialkyl-para-phenylene-diamin-thiosulfonic acid and a sulfurizing agent to act upon one another.

2. As new articles of manufacture the green-blue coloring-matters containing sulfur which can be obtained by allowing chloranil and unsymmetrical dialkyl-para-phenylene-diamin-thiosulfonic acid and a sulfurizing agent to act upon one another, which coloring-matters consist of violet-black powders which are slightly soluble in hot water, yielding blue solutions, and are easily soluble in concentrated sulfuric acid, yielding blue-green solutions, which are easily soluble in hot sodium sulfid, yielding yellowish-brown solutions, which are very slightly soluble in anilin, yielding green solutions, and in phenol, yielding green-blue solutions, which are insoluble in glacial acetic acid, in alcohol and in acetone, and which do not contain copper, and which produce on unmordanted cotton green-blue shades which are fast against the action of washing, light and chlorin.

In testimony whereof we have hereunto set our hands in the presence of two subscribing witnesses.

PAUL JULIUS.
EDUARD MÜNCH.

Witnesses:
J. ALEC. LLOYD,
JOS. H. LEUTE.